United States Patent [19] [11] 3,882,017
Wittrup [45] May 6, 1975

[54] METHOD AND APPARATUS FOR AERATION OF BIODEGRADABLE WASTE MATERIAL

[75] Inventor: Norman R. Wittrup, Lakewood, Colo.

[73] Assignee: Ren Vand, Inc., Webster City, Iowa

[22] Filed: Apr. 10, 1974

[21] Appl. No.: 459,847

[52] U.S. Cl. .................... 210/15; 210/63; 210/199; 210/220; 261/76
[51] Int. Cl. ......................... C02b 3/08; C02c 1/12
[58] Field of Search ......... 210/14, 15, 63, 199, 220, 210/242; 261/29, 36 R, 123, 124, DIG. 75, 76; 209/170

[56] References Cited
UNITED STATES PATENTS

| | | | |
|---|---|---|---|
| 1,821,914 | 9/1931 | Wagener | 261/76 X |
| 3,206,176 | 9/1965 | Peterson | 210/15 X |
| 3,238,021 | 3/1966 | Webber et al. | 261/124 X |
| 3,525,437 | 8/1970 | Kaeding et al. | 209/170 X |
| 3,555,783 | 1/1971 | Grimshaw | 261/124 X |
| 3,671,022 | 6/1972 | Laud et al. | 261/DIG. 75 |
| 3,734,850 | 5/1973 | Karr | 210/15 X |
| 3,799,511 | 3/1974 | Svantesson | 261/123 X |
| 3,805,481 | 4/1974 | Armstrong | 210/63 X |

FOREIGN PATENTS OR APPLICATIONS
942,754 11/1963 United Kingdom .................. 210/63

Primary Examiner—Charles N. Hart
Assistant Examiner—Robert H. Spitzer
Attorney, Agent, or Firm—Zarley, McKee, Thomte & Voorhees

[57] ABSTRACT

A method and apparatus for pressure aeration of biodegradable waste material to enhance the rate of degradation of aerobic bacteria. The method involves pressure aeration while in a turbulent state, followed by introduction to a mixing and separating zone, the mixing portion of said zone being separated from the separating portion of said zone by a back pressure creating means, the separating portion of said zone having a gas outlet through which undissolved gases and liquid are discharged and a treated waste material outlet through which aerated or treated waste material is discharged. The method and apparatus achieve 70 to 80 per cent oxygen saturation of the waste material in from a fraction of a second up to a few seconds.

14 Claims, 8 Drawing Figures

PATENTED MAY 6 1975     3,882,017
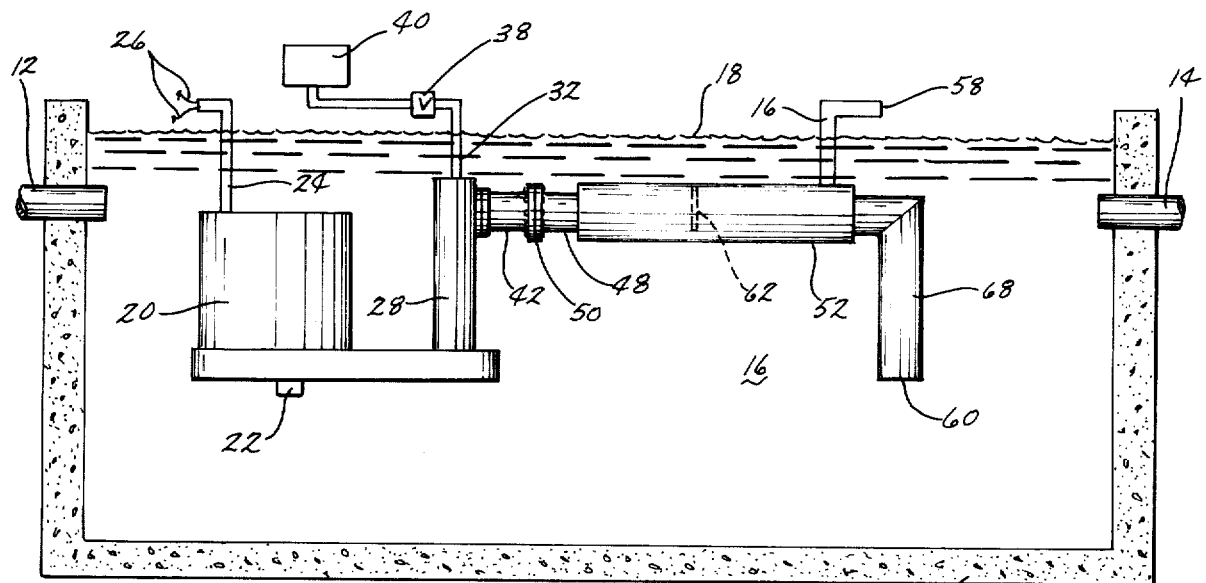
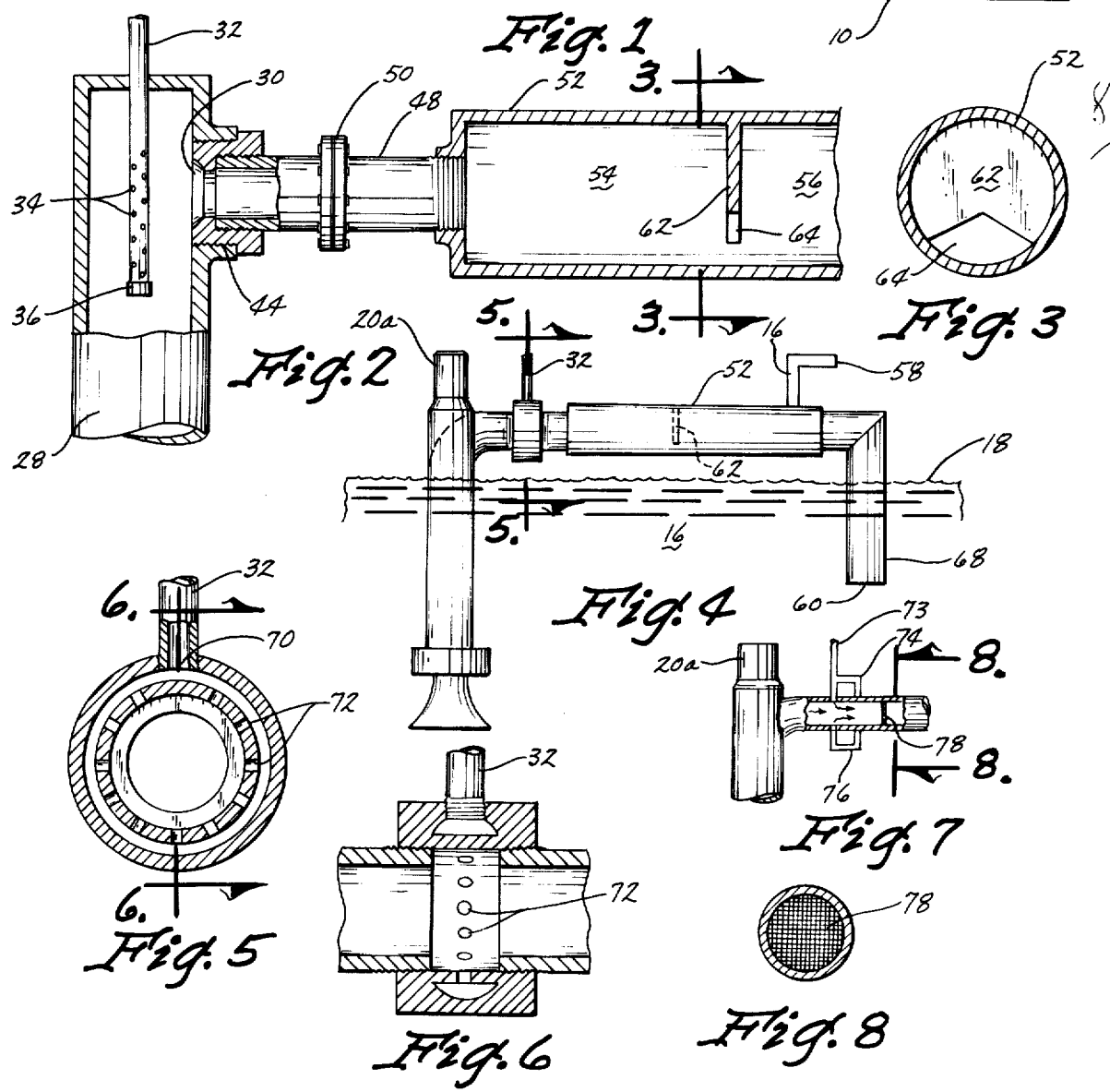

METHOD AND APPARATUS FOR AERATION OF BIODEGRADABLE WASTE MATERIAL

BACKGROUND OF THE DISCLOSURE

The present invention relates generally to pressure aeration of biodegradable waste material, and more particularly relates to a new and improved method and apparatus for sewage treatment in which 70 to 80 per cent of the amount of oxygen required for saturation is dissolved and retained in a sewage liquid in a very fast process (up to a few seconds) and in a highly efficient manner.

Sewage treatment operations often employ aerobic sewage systems in order to biodegrade the sewage material. Such system are well known. In aerobic bacteria sewage treatment systems the efficiency of that system is entirely dependent upon the efficiency of the aerobic bacteria. Aerobic bacteria can live off of human, animal or industrial waste and therefore treat such wastes as a nutrient. Thus the well-being of aerobic bacteria is essential to the efficiency of a system which employs them for waste treatment. The aerobic bacteria, as the name implies, need an adequate supply of oxygen to remain alive and well, just as humans do. Thus, an adequate supply of oxygen in the waste material to be treated is essential in order to allow the bacteria to rapidly and efficiently decompose human, animal or other industrial waste products. Experience has shown that aerobic bacteria will not adequately function in an oxygen-starved environment. Thus, any sewage treatment system which has an oxygen-starved environment cannot be expected to provide adequate sewage treatment such that the effluent will not be a pollutant.

Consequently various methods and apparatus for enriching the oxygen content of waste materials have been developed. Many of these systems involve applications of Henry's Law relating to solubility of gases in liquids and Dalton's Law of partial pressures. In its simpliest form these processes, since gases are more soluble in liquids under pressure, often pressure aerate, or oxygenate, waste material in an effort to increase their oxygen content. For examples of oxygen saturation methods and even super saturation methods see Grimshaw, U.S. Pat. No. 3,662,890, Grimshaw, U.S. Pat. No. 3,530,990, and Grimshaw, U.S. Pat. No. 3,555,783.

While the processes and apparatus of the above referred to patents may, in some circumstances, operate satisfactorily it has been found that they have certain deficiencies. For example, it has been found that the additional power needed to provide super saturated, or even saturated, liquid waste material solutions is at least twice as great as the amount of power needed to provide a 70 to 80 per cent oxygen saturated waste material solution. Moreover, the prior art processes often required long hold times in order to achieve oxygenation, or aeration, at or close to or even exceeding the saturation level. Accordingly, many of the prior art methods have been excessively expensive because of the extreme amount of energy required and the long hold times required. In accord with the process of this invention 70 to 80 per cent oxygen saturation of sewage waste material or the like can be achieved in up to a few seconds. As a result, a great conservation of power is achieved.

Another deficiency of many prior art methods and apparatus for pressure aeration of sewage material is that the apparatus often plugs with sewage sludge material. The apparatus of this invention does not have any serious plugging, or clogging, problems.

In addition, many prior art methods and apparatus are not easily adaptable to the variety of situations in which sewage material is treated. The method and apparatus of this invention is easily adaptable to a variety of waste treatment situations. For example, it can be used on open lagoons close to cattle-feeding operations, it can be used on farm ponds, it can be used in a closed tank treatment at conventional sewage plants, and so on.

Another serious problem of many prior art methods and apparatus involves the introduction of excessive foam caused by the pressure aeration. The method of this invention, primarily because of the point of withdrawal of excessive nondissolved gases with relationship to the turbulent mixing area, involves little or no foaming.

An additional advantage of the method and apparatus of this invention is that it can be adapted to dissipate heat energy generated by the pumps, energy which would normally be regarded as wasted, into the waste material in order to increase its average temperature. This is important since aerobic bacteria operate most efficienly at temperatures within the range of 70°F. to 80°F. The object of this invention is to accomplish all of the above stated objects as well as others which will become apparent from the following detailed description of the invention.

BRIEF DESCRIPTION OF THE DRAWINGS

FIG. 1 is a side elevation view of one waste treatment of this invention.

FIG. 2 is a side elevation view, with certain parts broken away, of a preferred apparatus of this invention.

FIG. 3 is a view taken along line 3 — 3 of FIG. 2 showing a back pressure creating valve.

FIG. 4 is a side elevation view of another embodiment of the invention.

FIG. 5 is a view along line 5 — 5 of FIG. 4 showing in detail the means of introducing air under pressure employed in FIG. 4.

FIG. 6 is a view along line 6 — 6 of FIG. 5 showing further details of the pressure aeration device of FIG. 4.

FIG. 7 is another embodiment of the invention showing yet another means of introducing under pressure air into the system of this invention.

FIG. 8 is a view of FIG. 7 along line 8 — 8 showing in detail an additional turbulent mixing means as employed in FIG. 7.

DETAILED DESCRIPTION OF THE INVENTION.

For purposes of clarity, the invention will first be described with reference to FIGS. 1 and 2. FIG. 1 shows a complete sewage treatment system of this invention used in a sewage holding tank 10. The sewage holding tank 10 has a raw sewage inlet 12 and a treated sewage outlet 14. The tank is filled with raw sewage material 16. Raw sewage material 16 includes all of the human or other waste sewage material and a large amount of water. Hereinafter on occasion the sewage material will be referred to as a slurry and it is understood that this means the waste material and the water utilized to carry the waste material. The water level in tank 10 is depicted at 18. Thus, as can be seen from the above the embodiment of the invention shown in FIG. 1 employs primarily a submerged treatment system.

As previously mentioned it is to be understood that tank 10 is shown only for purposes of illustration. The sewage containing structure could just as well be a lagoon, a farm pond which is to be aerated, or the like.

A submerged pump 20 having an inlet 22 is mounted in tank 10 by conventional means. Conduit 24 leads to the power source for pump 20 and carries electrical lines 26. Pump 20 may be a standard self-priming pump of suitable capacity. The pump may be of the centrifugal self-priming or foot valve control type or any other conventional means. In a typical embodiment the pump 20 is a 2 h.p. 200 gallon per minute pump. Sewage slurry is drawn by pump through inlet 22 and pumped into riser conduit 28. Riser 28 defines a first confined zone for the sewage material to be treated. As depicted in FIGS. 1 and 2, riser 28 has an outlet 30 which is of smaller diameter than the inside diameter of riser 28. Extending downwardly into riser 28 is sparger 32. Sparger 32 has apertures 34 for introduction of air under pressure into waste material confined within the confining zone confined by riser 28. Sparger 32 is plugged at the bottom end thereof by plug 36. Sparger 32, as depicted in FIG. 1, is in communication by suitable valve means 38 with compressor 40. Thus compressor 40 can introduce air through valve 38 and sparger 32 into the zone defined by riser 28.

In actual operation, as can be seen from the above description, the flow of the waste material 16 in riser 28 will be extremely turbulent. Since the inlet into riser 28 and the inside diameter of riser 28 is greater than the riser outlet 30, back pressure will be created in riser 30. This will induce turbulence therein. In addition, forcing compressed air into riser 28 through sparger 32 and apertures 34, will further induce turbulence within the confine zone defined by riser 28. Thus, within riser 28 turbulence is induced by back pressure means and by introduction of air under pressure. As a result of the extreme turbulence occurring within riser 28 intimate contact between the air and the sewage material to be treated will occur. Thus, the tubulent action is advantageous in that increased contact between the sewage material and the pressurized air will occur allowing for greater dissolving capacity. In fact, what occurs in riser 28 is that many small bubbles of air are formed in the sewage material.

The aerated sewage material passes out of riser 28 through outlet 30. Riser outlet 30 is defined by a "T-fitting" of conventional construction which allows for threadably receiving conduit 42 into threaded portion 44 of riser 28. Conduits 42 and 48 are joined in sealed relationship by conventional means at 50. Conduits 42 and 48 define a conveying zone of smaller inside diameter than the inside diameter of riser 28. As a result, the velocity of aerated sewage material traveling in the conveying zone defined by conduits 42 and 48 is higher than the velocity in riser 28. However, correspondingly, since the velocity is higher, and the diameter smaller than the diameter of riser 28, it follows that the turbulence in the conveying zone defined by conduits 42 and 48 will be increased. This is advantageous in that aerated sewage material within the conveying zone is thoroughly mixed which increases the solubilization of air in the sewage material.

After traveling through the conveying zone at the increased turbulence within the conveying zone, the aerated sewage material enters a mixing and separating zone defined by conduit or pipe 52. Conduit 52 has a larger inside diameter than the inside diameter of the conveying zone and as a result the velocity of the aerated sewage material decreases upon entering the mixing and separating zone defined by conduit 52. Conduit 52 is, of course, in sealing relationship with conduit 48. Conduit 52 has a mixing area 54 and a separating area 56. Separating area 56 has an excess or undissolved air and other gas outlet 58 which is of smaller inside diameter than the inside diameter of conduit 52. Undissolved gas outlet 58 discharges undissolved gases above the surface level 18 of the sewage material 16.

Downstream from undissolved gas outlet 58 is aerated sewage outlet 60. Aerated sewage outlet 60 discharges aerated sewage back into tank 10. Preferably, aerated sewage outlet 60 is of a smaller diameter than the mixing and separating zone in order to provide an increased pressure which will cause some turbulence and mixing when aerated sludge is discharged through outlet 60 back into tank 10.

It should be noted that mixing area 54 and separating area 56 of conduit 52 are separated by back pressure valve means 62, and that undissolved gases are withdrawn downstream from back pressure valve 62. These features are very important to applicant's invention and the proper performance thereof as explained below.

During in-use operation aerated sewage material enters mixing zone 54 at an increased velocity since mixing zone 54 is of a greater inside diameter than the diameter of the conveying zone defined by conduits 42 and 48. Back pressure valve means 62 restricts the flow of the aerated sewage material and causes back pressure as well as an extreme amount of turbulence in mixing zone 54. This turbulence and increasing pressure caused by the back pressure further insures proper mixing and contact between the air and the sewage material and further induces solubilization of the air within the sewage material and breaks up any large bubbles that might still be present and offer the potential for subsequent foaming problems. The thoroughly mixed sewage material passes through opening 64 in back pressure valve means 62 into separating zone 56. Of course the back pressure will be eliminated in separating zone 56 and as a result the velocity of the aerated sewage material will decrease. The decreased velocity in separating zone 56 allows the undissolved gases to move to the top of separating zone 56 with the aerated sewage material staying towards the bottom of separating zone 56. As a result of the decrease in velocity in separating zone 56, the excess undissolved gases, which might otherwise create foaming problems, are discharged or allowed to escape through the conduit 66 and undissolved gas outlet 58. The undissolved gases are allowed to escape above the water line 18 because the undissolved gases contain a high percentage of nitrogen which is less soluble in water than is oxygen. Since the nitrogen is not valuable to enhancing the activity of the aerobic bacteria, and since increasing the dissolved nitrogen content of the sewage material would offer no benefit, and would in fact be harmful since it would further limit the oxygen-dissolving capabilities of the waste material, the undissolved gases are discharged above the water line 18 into the atmosphere. Conduit 66 contains no valve and is a full-flow conduit. This also has a tendency to decrease foaming. The inside diameter of conduit 68 is restricted, with respect to the inside diameter of separating area 56 only enough to insure that conduit 66 will carry a full flow of liquid and excess gases without any foaming occurring.

Aerated sewage outlet 60 is defined by conduit 68 and is very slightly restricted in terms of inside diameter with respect to the inside diameter of separating area 56. The restriction in diameter which occurs at the entrance to waste sewage treatment outlet conduit 68 and correspondingly the end of separating zone 56 insures that undissolved gases will escape through outlet 58 and not be carried on into tank 10 with aerated sewage material. In addition, the increased pressure insures some mixing at the outlet 60 with sewage material already in tank 10.

Although the basic principle of operation is the same, FIGS. 4, 5, 6, 7 and 8 define certain alternative embodiments of the invention. FIG. 4 shows an abovewater pump 20a and an alternative pressure aeration means to the sparger 32 shown in FIGS. 1 and 2, as can most clearly be seen in FIGS. 5 and 6. Aeration is accomplished in a confining zone defined by the concentric pipe arrangement shown in FIG. 5. The pressurized air is introduced through inlet 70 and passes through communicating ports 72 into the confining zone carrying the sewage material to be aerated. Turbulent mixing is induced by the pressure aeration.

In all respects the operation of the device of FIG. 4 is similar to that described with reference to FIGS. 1 and 2.

FIG. 7 shows yet another alternative means for aeration of the sewage material. In FIG. 7 there is shown compressed air line 73 which separates into lines 74 and 76 which allow pressurized air to enter upon the opposite sides of the conduit. FIG. 8 shows a back pressure and mixing valve means or screen as employed in FIG. 7 positioned prior to entry into the mixing and separating zones. This further insures tubulent mixing. In particular, in FIG. 8 this back pressure and mixing valve means is a screen member 78 which fully fits within the conduit 48.

EXAMPLE

It is to be understood that the following example is offered to not limit but only to further illustrate the operational features of the invention.

In one example of the operation of the process and system of this invention a sewage tank 10 was filled with 6,600 gallons of sewage. Sewage was fed into tank 10 at a rate of 2 gallons/minute and withdrawn at the same rate. The pump 20 was a 2 h.p. 200 gallon/minute capacity pump, based upon a 14 foot discharge head. The riser 28 was 12 inches high and had an inside diameter of 3 inches. The sparger 32 had an inside diameter of ½ inch and the apertures 34 were 3/16 inch. This was sufficiently large to prevent plugging and still allow formation of microbubbles. The compressor 40 was a ¼ h.p. compressor and pumped 2.2 to 2.3 cubic feet of air per minute at a pressure of 6.5 pounds p.s.i.g. The diameter of the riser outlet 30 and the conveying zone defined by conduits 42 and 48 was restricted down to an I.D. of 2.5 inches. The length of the conveying zone was 6 inches long. The inside diameter (I.D.) of conduit 52 and correspondingly of mixing zone 54 and separating zone 56 was 4 inches. The length of the mixing area 54 was 8 inches and the length of the separating zone 56, 16 inches. The diameter of the conduit 58 was 1 inch and the diameter of sewage outlet 60 and conduit 68 was 2.5 inches.

The average oxygen content of the sewage input into the system was 1.0 p.p.m. The average oxygen content of the aerated sewage discharged at 60 was 5.5 p.p.m. Other runs revealed the increase in oxygen content to be within the range of from 70 to 80 per cent of saturation.

No foaming problems were found to occur and the biodegradation activity level was substantially enhanced. No plugging occurred. Heat generated by the submerged pump was dissipated into the sewage in tank 10.

What is claimed is:

1. A method of pressure aeration of biodegradable waste material to enhance the rate of degradation by aerobic bacteria present in the waste material, said method comprising:

introducing under conditions of high velocity a waste material slurry taken from a reservoir of biodegradable waste material into a confining zone to create a pressure greater than atmospheric, and to create high velocity turbulent flow, introducing air under pressure into said confining zone to further increase turbulence therein and to provide an aerated slurry, withdrawing the aerated slurry from said confining zone, and introducing said aerated slurry into a mixing and separating zone, having a mixing area and a separating area with said mixing area separated from said separating area by a back pressure creating means, wherein further turbulent mixing occurs in said mixing area, and withdrawing from said separating area and discharging downstream of said back pressure creating means, excess air and undissolved gases from said separating area, and discharging under conditions of high velocity said aerated slurry from said separating area into said reservoir of said waste material below the surface thereof.

2. The method of claim 1 wherein said excess air and other undissolved gases are discharged to the atmosphere, above the treated sewage material.

3. The method of claim 2 wherein substantially no foam is discharged with said aerated slurry.

4. The method of claim 1 wherein the aeration achieved by the process is from about 70% to about 80% of the oxygen saturation level of said waste material.

5. The method of claim 1 wherein heat energy created by introducing said waste material into said confining zone is dissipated into said sewage material to increase its average temperature.

6. The method of claim 1 wherein the velocity and turbulence of said aerated slurry is greater in the confining and conveying zones and in the mixing area of said mixing and separating zone than the velocity and turbulence of said aerated slurry in the separating area of said mixing and separating zone.

7. The method of claim 1 wherein said aerated slurry is withdrawn from said confining zone and introduced into a conveying zone, and thence withdrawn from said conveying zone and introduced into said mixing and separating zone.

8. The method of claim 7 wherein the velocity of aerated sewage material in said conveying zone is greater than the velocity in said confining zone.

9. A waste treatment system comprising:
   a pump means to pump sewage material at high velocity,
   a riser means in communication with said pump means to receive sewage material at high velocity from said pump,
   an air introduction means to introduce air under conditions of pressure and turbulence into said riser means and to aerate sewage material within said riser means,
   a conveying means,
   a mixing and separating means,
   said conveying means being in communication with said riser means
   at a first end and in communication with said mixing and separating means at a second end,
   said mixing and separating means having a mixing area and a separating area separated by a back pressure valve means,
   said separating area having a gas discharge outlet and an aerated sewage outlet.

10. The system of claim 9 wherein an intake opening of restricted size appears between said riser and said conveying means to induce increased pressure and turbulence of the sewage material within said riser means.

11. The system of claim 9 wherein said air introduction means is a sparger.

12. The system of claim 9 which is a submerged sewage treatment system.

13. The system of claim 12 wherein said gas discharge outlet is adapted to discharge gases to the atmosphere.

14. A waste treatment system comprising;
   a pump means to pump sewage material at high velocity,
   a riser means in communication with said pump means to receive sewage material at high velocity from said pump,
   an air introduction means to introduce air under conditions of pressure and turbulence into said riser means and to aerate sewage material within said riser means,
   a mixing and separating means in communication with said riser,
   said mixing and separating means having a mixing area and a separating area separated by a back pressure valve means,
   said separating area having a gas discharge outlet and an aerated sewage outlet.

* * * * *